(12) United States Patent
Jasty et al.

(10) Patent No.: US 10,671,536 B2
(45) Date of Patent: Jun. 2, 2020

(54) METHOD AND APPARATUS FOR CACHE PRE-FETCH WITH OFFSET DIRECTIVES

(71) Applicants: Ananth Jasty, San Jose, CA (US); Indraneil Gokhale, Fremont, CA (US)

(72) Inventors: Ananth Jasty, San Jose, CA (US); Indraneil Gokhale, Fremont, CA (US)

(*) Notice: Subject to any disclaimer, the term of this patent is extended or adjusted under 35 U.S.C. 154(b) by 85 days.

(21) Appl. No.: 15/722,986

(22) Filed: Oct. 2, 2017

(65) Prior Publication Data
US 2019/0102304 A1   Apr. 4, 2019

(51) Int. Cl.
G06F 12/0862 (2016.01)
G06F 12/14 (2006.01)
G06F 12/0897 (2016.01)
G06F 12/0888 (2016.01)

(52) U.S. Cl.
CPC ...... *G06F 12/0862* (2013.01); *G06F 12/0888* (2013.01); *G06F 12/0897* (2013.01); *G06F 12/1408* (2013.01); *G06F 2212/1024* (2013.01); *G06F 2212/262* (2013.01); *G06F 2212/602* (2013.01); *G06F 2212/604* (2013.01); *G06F 2212/6026* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 2003/0208660 A1* | 11/2003 | van de Waerdt | G06F 12/0862 711/137 |
| 2006/0179236 A1* | 8/2006 | Shafi | G06F 12/0862 711/137 |
| 2008/0183903 A1* | 7/2008 | VanStee | G06F 13/161 710/5 |
| 2016/0321107 A1* | 11/2016 | Kruglick | G06F 12/0862 |

* cited by examiner

*Primary Examiner* — Denise Tran (57) ABSTRACT

A method and apparatus for pre-fetching data into a cache using a hardware element that includes registers for receiving a reference for an initial pre-fetch and a stride-indicator. The initial pre-fetch reference allows for direct pre-fetch of a first portion of memory. A stride-indicator is also received and is used along with the initial pre-fetch reference in order to generate a new pre-fetch reference. The new pre-fetch reference is used to fetch a second portion of memory.

7 Claims, 7 Drawing Sheets

METHOD AND APPARATUS FOR CACHE PRE-FETCH WITH OFFSET DIRECTIVES

BACKGROUND

Although we have developed very high speed processing cores, one significant problem in computer systems is that these high-speed processing cores often sit idle because the instructions that they need to execute cannot be retrieved, or "fetched" quickly enough from memory. Fundamentally, if all memory in a computer system could be made lightning fast, then these high-speed processing cores would operate at their intended speed and never sit idle.

If all memory in a computer system was incredibly fast in terms of response time, then instructions could be fetched rapidly enough that a processing core could continue executing instructions without any lost time. But memory is expensive and the faster the memory, the more expensive it is. That is why computer systems have varying types of memories.

A cache memory is a small, very high speed memory that can provide instructions or data to a processing core so quickly that the processing core does not need to wait. Early implementations of cache memory would simply copy memory from a slower main memory in hopes that the same instruction would be needed again soon. This technique works fairly well when a computer program is intended to perform the same functions on a large data set. In this scenario, the same instructions, having been recently stored in the cache memory, could be quickly delivered to the processing core each time they are needed to execute the same function on different data.

It is not difficult to see that if a computer program prescribes a more linear series of functions, simply storing the most recently executed instructions into a cache memory is not very useful. This is because the most recently executed instructions are not likely to be executed soon, if ever again. In those applications where a linear program must be supported, one way that a cache memory can be effective is to pre-fetch instructions just after a currently executed instruction. This way, once a processing core executes a current instruction, it is likely that the next-needed instruction will be in the cache. When this happens, the next-needed instruction can be provided immediately once the processing core tries to fetch that next instruction.

Most computer systems use different levels of cache memories. For example, a "Level-0" cache is a cache memory that is located in the same silicon chip as the processing core. "Level-1" cache is closer to the processing core than a "Level-2" cache, and so on until main memory is reached. Cache memory that is disposed closer to the processing core is usually smaller in capacity than a cache memory set closer to the main memory. No matter what the overall structure of a cache memory system is, it can only be effective if it contains instructions that are next-needed by the processing core. Otherwise, the processing core is forced to wait until the next instruction is retrieved from main memory.

Pre-fetching instructions from main-memory is relatively simple, and an appropriate schema for doing so can be selected based on the type of computer program that is being executed. Repetitive tasks can rely on decent cache memory performance based on copying into the cache the most recently used instructions. Linear program paradigms typically use instruction pre-fetch so that next-needed instructions can be retrieved from main memory and stored into cache memory.

Cache memory can also be useful for data subject to a particular program. Some data is compact and is used repeatedly through a complex series of functions. Multiplying a matrix by another matrix is one mathematical function where the same set of data is used repeatedly. In such applications, the data is compact and repeatedly accessed by the processing core. In this case, storing the most recently used information in a cache memory can be very effective.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Increased effectiveness of cache memory performance, according to the techniques and teachings presented herein, is finally achievable for situations where data is large. In fact, the present techniques and teachings are even more effective when streaming data must be processed. Although not entirely limited to applications for processing streaming data, techniques and methods herein described provide for effective pre-fetch of streaming data. Accordingly, the claims appended hereto are not intended to be limited in scope to any particular type of data or to any particular type of processing of said data.

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Up until now, pre-fetch of instructions and/or data has been accomplished using hardware mechanisms integrated with cache memory systems. Today, these hardware mechanisms are augmented with a priori knowledge in order to enhance the efficacy of cache memory data pre-fetch where the data to be pre-fetched is stored at regular boundaries. According to one illustrative use case, this a priori knowledge is received from a processing core executing a computer program. Accordingly, the new hardware mechanisms herein described utilize this a priori knowledge to more effectively pre-fetch data based on a new concept called a "stride".

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Figure 1:
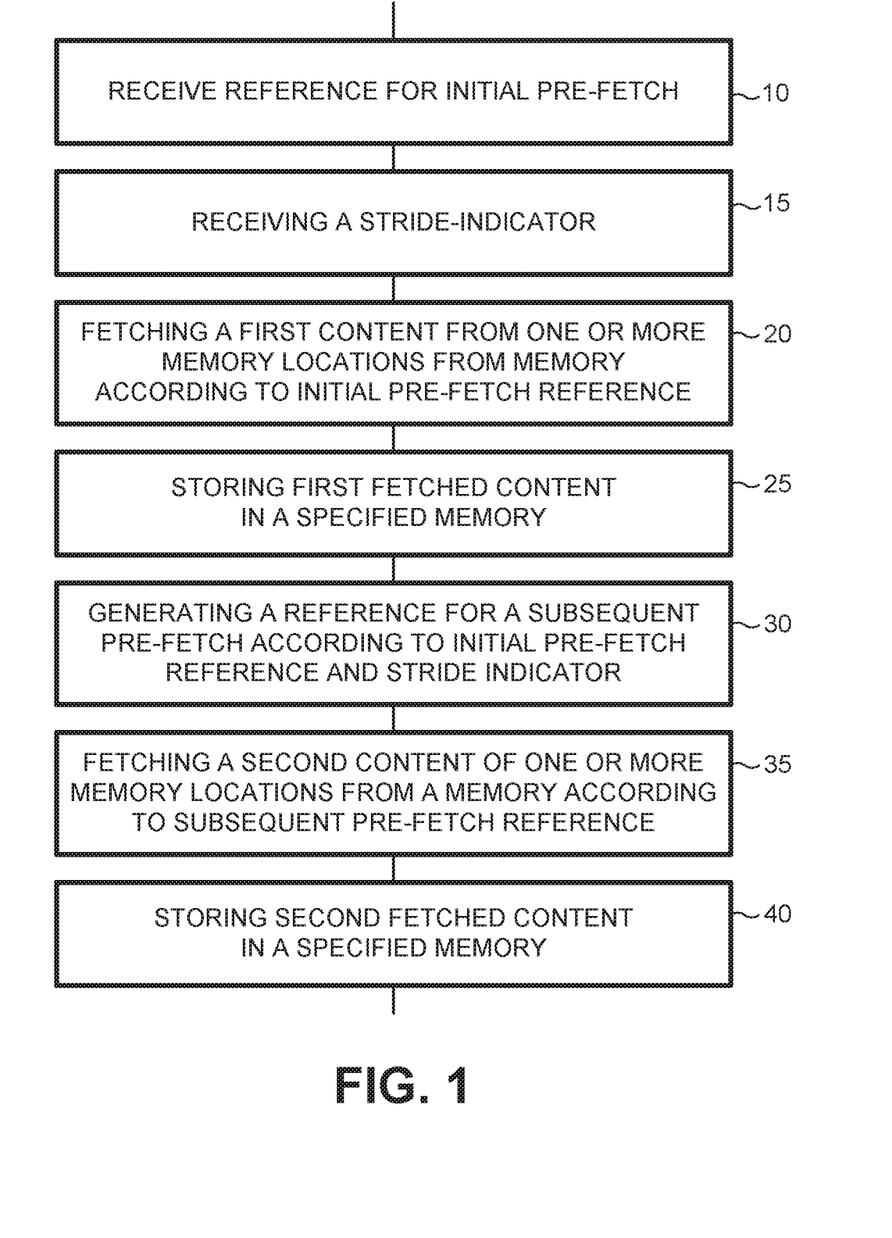
FIG. 1 is a flow diagram that depicts one example method for prefetching information and storing it in a cache memory.

FIG. 1 is a flow diagram that depicts one example method for prefetching information and storing it in a cache memory. According to this example method, prefetching a cache entry is accomplished by way of a hardware machine by first receiving a reference for an initial pre-fetch (step 10). According to one alternative example method, the reference for the initial pre-fetch comprises an address corresponding to a location in a source memory, from whence pre-fetch is accomplished. It should be appreciated that, according to various illustrative use cases, the reference for initial pre-fetch is received into a hardware register included in a hardware machine; said machine configured for managing pre-fetches according to the techniques and teachings herein presented.

This example method further includes a step for receiving a stride-indicator (step 15). It should be appreciated that the stride-indicator provides a priori knowledge as far as any repetitive nature as to information intended to be pre-fetched according to the techniques herein presented. It should be appreciated that, according to this alternative example method, the stride-indicator is also received into a hardware machine, for example such as in a hardware register included in said machine.

This example method further includes a step for fetching a first content according to the initial pre-fetch reference (step 20). It should be appreciated, that according to this example method, the first content includes the content of one or more memory locations from a source memory. It should likewise be appreciated that the source memory, according to various alternative example use cases, comprises at least one of a main-memory and a cache memory, where the cache memory to be used as a source for a pre-fetch is closer to the main-memory then the cache memory into which pre-fetched information is to be stored. Once the information is fetched, it is then stored in a specified memory (step 25).

According to this example method, hardware mechanisms are further employed to generate a reference for a subsequent pre-fetch. This example method further includes a step for generating such a reference according to the initial pre-fetch reference and the stride-indicator (step 30). It should be appreciated that, according to at least one illustrative use case, a second portion of information that needs to be pre-fetched resides in a source memory at a location that is defined by the base-address associated with the first pre-fetch and the stride-indicator. Put in lay terms, additional pre-fetches beyond a first, initial pre-fetch are located in memory at multiples of the stride-indicator relative to the beginning of said first pre-fetch. As can be appreciated, the initial pre-fetch reference is received by a hardware machine, see step 10, above.

According to this example method, a second content is fetched from one or more memory locations from a memory according to the generated reference (step 35). The fetched second content then is stored in a specified memory (step 40).

Figure 2A:
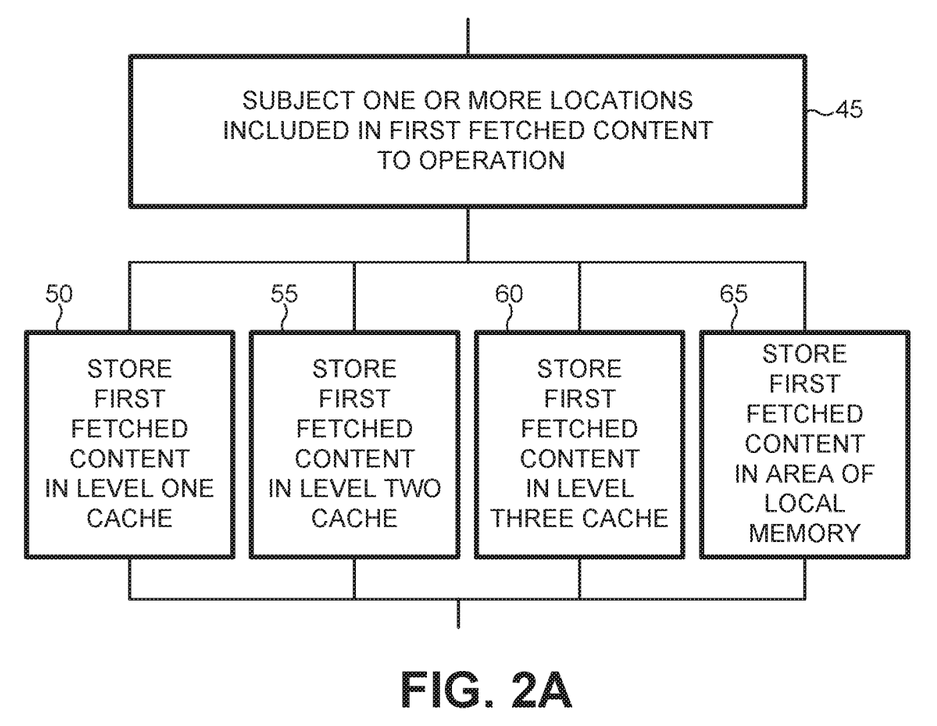
FIG. 2A is a flow diagram that depicts alternative example methods for storing a first fetched content in a specified memory.

FIG. 2A is a flow diagram that depicts alternative example methods for storing a first fetched content in a specified memory. As already discussed above, various memory systems include various levels of cache memory and a main-memory. Some processing systems also include a very high-speed random-access-memory (RAM) that is proximate to the processing core, but is not structured as a cache memory. For the purpose of this disclosure, such non-cache memory proximate to a processing core shall be referred to as "local-general-memory".

According to one alternative example method, storing the first fetched content in a specified memory comprises an optional step for subjecting to an operation the fetched content of one or more locations of a source memory (step 45). It should be appreciated that, since the present method is applied in a hardware machine, one alternative method includes such optional step to perform some function upon either the content of one memory location or upon the content of several memory locations. Again, this is an optional step of the example method taught herein. In those examples wherein a fetched content is subject to an operation, the resulting content is then stored in a specified memory as described below, for example in steps 50, 55, 60, and 65.

In one alternative example method, the content of one or more locations fetched from a source memory is stored in a level-one cache memory (step 50). In a second alternative example method, the content of one or more locations fetched from a source memory is stored in a level-two cache memory (step 55). In another alternative example method, the content of one or more locations fetched from a source memory is stored in a level-three cache memory (step 60). One additional alternative example method provides for storing the content of one or more locations fetched from a source memory in a local-general-memory, as heretofore described (step 65).

Figure 2B:
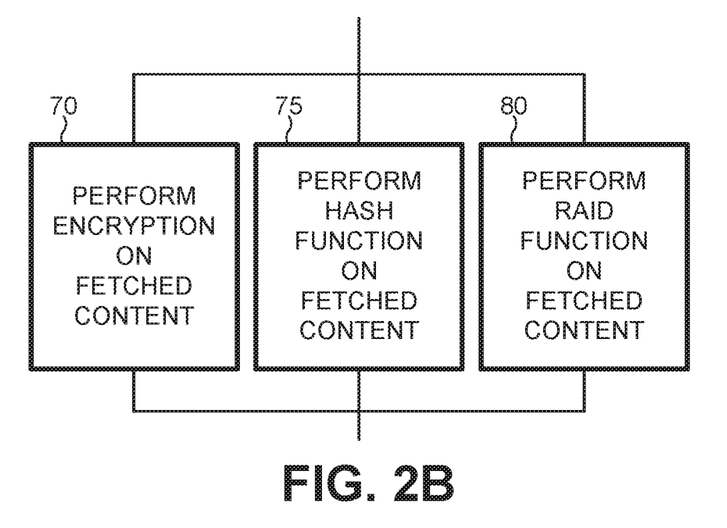
FIG. 2B is a flow diagram that depicts alternative example methods for performing an operation upon a fetched content.

FIG. 2B is a flow diagram that depicts alternative example methods for performing an operation upon a fetched content. According to various illustrative use cases, fetched content to be stored in a cache memory (or in a specified memory) is subject to various processing by a hardware machine that is managing the pre-fetch process. According to one alternative example method, fetched content is encrypted (step 70). It should be appreciated that, according to various illustrative use cases, the content of one or more memory locations is encrypted.

According to yet another alternative example method, the content fetched from memory is subject to a hash function (step 75) before it is stored in a specified memory. In yet another alternative example method, the content fetched from a memory is subject to a redundant-array-of-independent-discs (RAID) operation (step 80). In these example alternative methods, it is the resulting information that is then stored in the specified memory, be it a cache memory or a local-general-memory.

Figure 3:
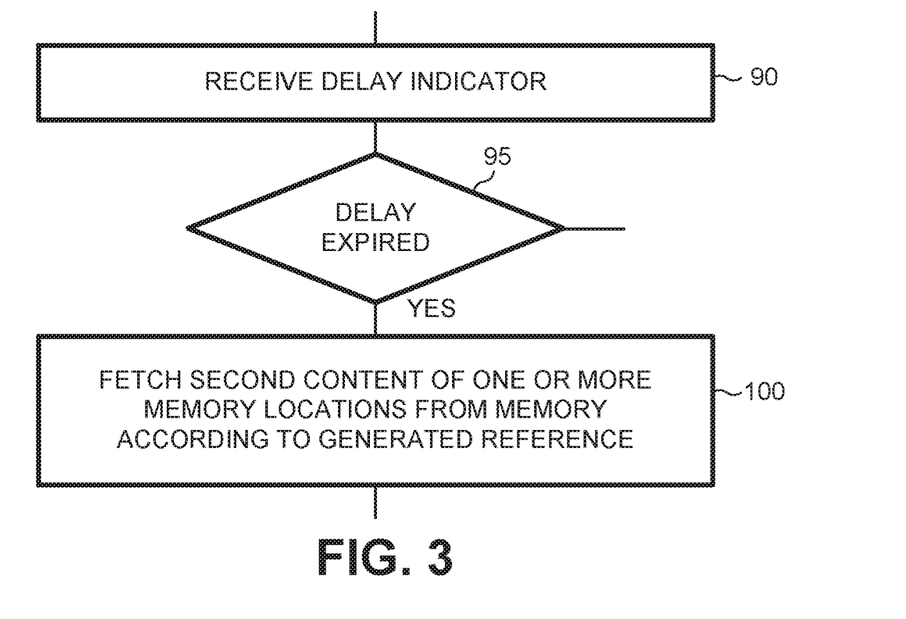
FIG. 3 is a flow diagram that depicts one alternative example method wherein the rate of pre-fetch is limited through the use of a priori knowledge of how much time is required by a processing core to process information associated with a pre-fetch.

FIG. 3 is a flow diagram that depicts one alternative example method wherein the rate of pre-fetch is limited through the use of a priori knowledge of how much time is required by a processing core to process information associated with a pre-fetch. It should be appreciated that, even though the hardware mechanism herein described is capable of pre-fetching information very quickly, a processing core may not need information as frequently as pre-fetch hardware mechanisms are able to affect such pre-fetches.

Accordingly, memory bandwidth may be conserved by providing to the hardware mechanism an a priori delay-indicator. As such, this alternative example method provides for a step wherein such delay-indicator is received (step 90). In one illustrative use case, this delay-indicator is stored in a hardware registered, included in a hardware mechanism structure to affect pre-fetches according to the techniques and teachings herein described. As such, a second content of one or more memory locations will not be fetched from a source memory (step 100) until such delay has expired (step 95). In one illustrative use case, this delay indicator is used to seed a hardware timer.

Figure 4:
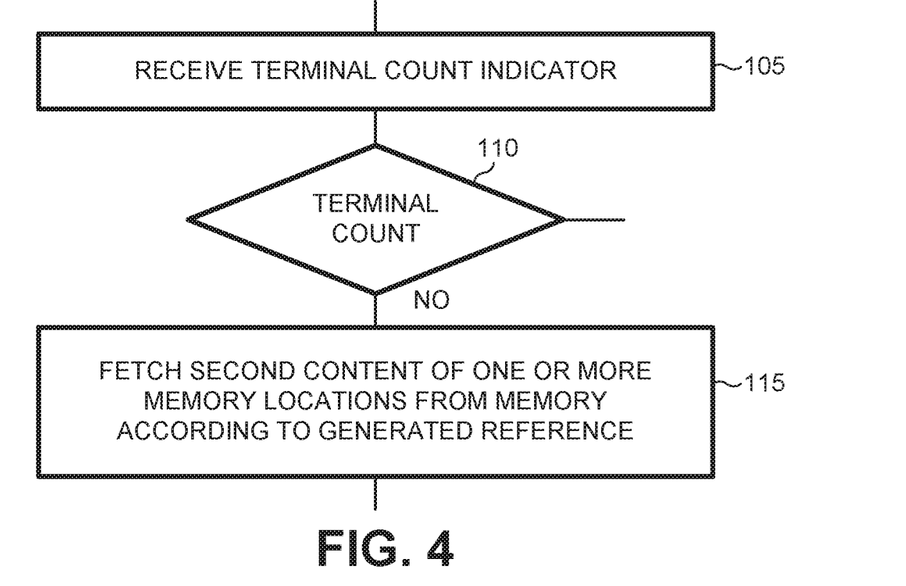
FIG. 4 is a flow diagram that depicts one alternative example method wherein pre-fetches occur for a fixed number of cycles.

FIG. 4 is a flow diagram that depicts one alternative example method wherein pre-fetches occur for a fixed number of cycles. According to this alternative example method, a hardware device receives a terminal count indicator (step 105). Accordingly, a second content is fetched according to a generated reference (step 115) so long as the terminal count value is not satisfied (step 110). It should be appreciated that, according to this alternative example method, a priori knowledge as to the length of information is shared with the hardware device that is managing pre-fetches so that pre-fetches may be discontinued once the end of data is reached.

Figure 5A:
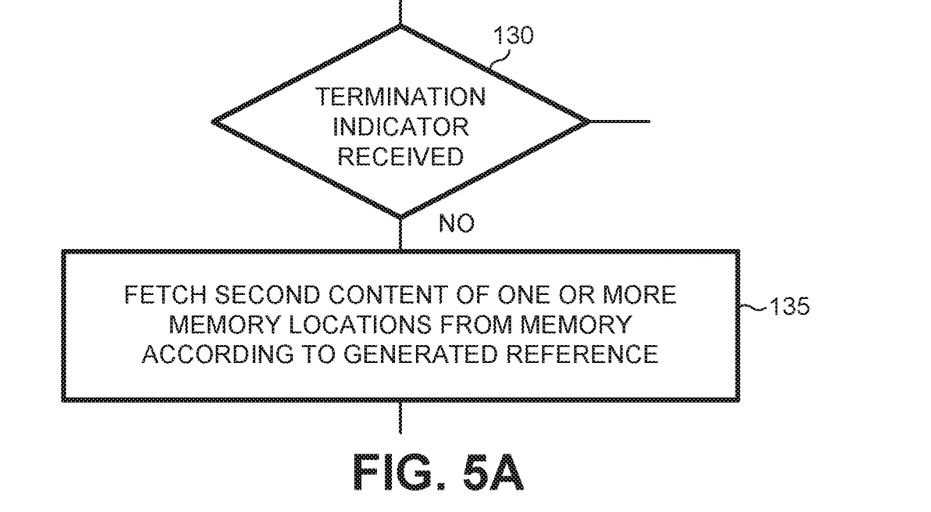
FIG. 5A is a flow diagram that depicts one alternative example method wherein pre-fetches continue until they are intentionally terminated.

FIG. 5A is a flow diagram that depicts one alternative example method wherein pre-fetches continue until they are intentionally terminated. It should likewise be appreciated that, as a processing core is processing data, the processing core may need to terminate its data processing operations. This, according to various alternative methods, may merely be because there is no longer any data to process or that there is no longer a need to produce additional output based on an input data stream. In such case, second content of one or more memory locations is fetched (step 135) until a termination indicator is received (step 130).

Figure 5B:
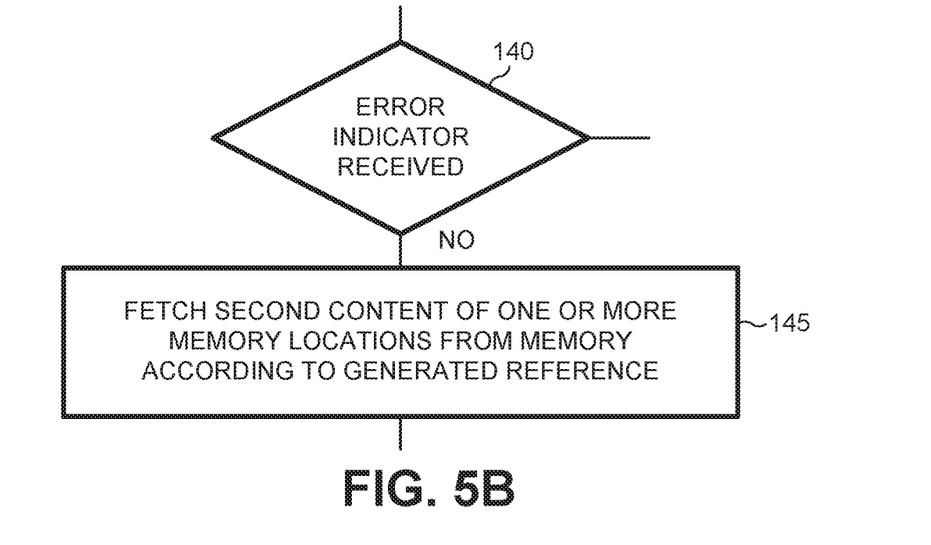
FIG. 5B is a flow diagram that depicts one alternative example method wherein pre-fetches continue until an error is detected.

FIG. 5B is a flow diagram that depicts one alternative example method wherein pre-fetches continue until an error is detected. It should be appreciated that, according to this one alternative example method, a hardware process of prefetching content from a source memory will continue so long as an error does not occur. Accordingly, a second content is fetched from a source memory (step 145) so long as an error indicator is not received (step 140). Such error indication, according to various alternative methods, comprises an error-checking-correction (ECC) error. In other illustrative use cases, external errors, such as loss of a data connection over a network, are also processed as errors according to the present method and preclude additional pre-fetch activity.

It should likewise be appreciated that any and all of these methods may be combined. For example, pre-fetch may continue so long as terminal count has not been satisfied and an error has not been indicated. These example methods are not inconsistent with each other, and may be freely combined in various illustrative use cases where a hardware machine is managing pre-fetch of data from a source memory and storage of that memory content into a specified memory, for example at least one of a cache memory and a local-general-memory.

Figure 6:
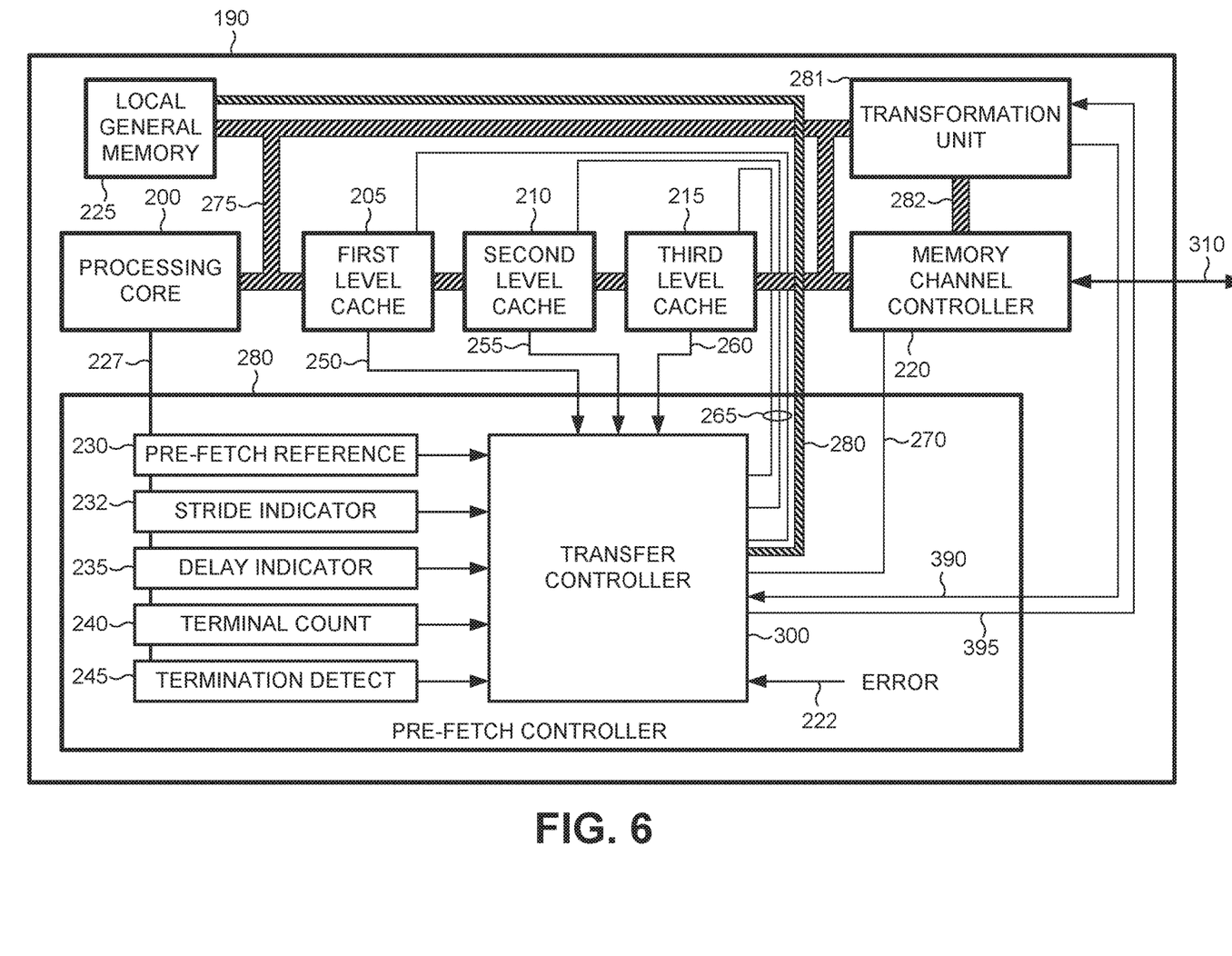
FIG. 6 is a pictorial diagram that depicts several alternative example embodiments of a processing system that includes intelligent pre-fetch.

FIG. 6 is a pictorial diagram that depicts several alternative example embodiments of a processing system that includes intelligent pre-fetch. According to one alternative example embodiment, a processing system 190 comprises a memory for storing content pre-fetched from a location in a source-memory, a memory channel controller 220 that is coupled to the memory and which includes an interface 310 for accessing an external source memory, and a processing core 200. According to various alternative example embodiments, the memory included in the processing system 190 includes at least one of a local-general-memory 225, a first-level cache memory 205, a second-level cache memory 210, and a third-level cache memory 215.

As depicted in the figure, the processing core 200 is communicatively coupled to the memory by means of an internal memory bus 275. The internal memory bus 275 also allows the processing core 200 to communicate with the memory channel controller 220. In one alternative example embodiment, the processing system 190 further includes a transformation unit 281. In this alternative example embodiment the internal memory bus 275 is also communicatively coupled to the transformation unit 281. A special transfer bus 282 also allows direct communication from the memory channel controller 222 to the transformation unit 281.

In this example embodiment, the processing system 190 further includes a pre-fetch controller 280. The pre-fetch controller 280 also includes a pre-fetch reference register 230 and a stride-indicator register 232. The pre-fetched reference register 230 is capable of storing a reference for an initial pre-fetch. The stride-indicator register 232 is capable of storing a stride-indicator, which is used by a transfer controller 300, included in the pre-fetch controller 280, to generate a subsequent pre-fetch reference.

In operation, the processing core 200, when it executes particular software, is minimally caused by that software to direct a priori knowledge about data stored in an external-source-memory in order to achieve greater pre-fetch efficiency. The processing core 200, when executing such particular software, minimally directs an initial pre-fetch reference to the pre-fetch reference register 230 and also minimally directs a stride-indicator to the stride-indicator register 232. The processing core 200 communicates these values by way of a configuration interface 227, which provides a communications path between the processing core 200 and the various configuration registers included in the pre-fetch controller 280.

The pre-fetch controller 280 also includes a transfer controller 300. The transfer controller 300, which in this alternative example embodiment comprises a hardware machine, is capable of controlling the memory channel controller 220 by means of a control interface 270. The transfer controller 300 internalizes the initial pre-fetch reference stored in the pre-fetch reference register 230 and uses this as a basis for an initial pre-fetch of content from an external-source-memory.

In operation, the transfer controller 300 receives information from at least one of the first-level cache memory 205, the second-level cache memory, and the third-level cache memory 215. Transfer controller 300 receives this by means of individual status interfaces 250, 255, 260. These status interfaces are capable of providing information to the transfer controller 300 upon which to determine what locations in a cache memory are available to store information that the transfer controller 300 intends to pre-fetch from an external-source-memory. Based on availability of storage in any particular cache memory, the transfer controller 300 is capable of controlling storage of information using control signals 265 for various cache memories included in the processing system 190.

In at least one alternative example embodiment, the transfer controller received a "CONSUMED" indicator from a cache memory. The CONSUMED indicator is set when a cache line is retrieved by the processing core 200 and that cache line was previously stored according to a pre-fetch as herein described. Hence, those cache lines that have been processed (i.e. consumed) by the processing core 200 are available for storage needed to support subsequent pre-fetch activity.

Accordingly, the transfer controller 300 is capable of manipulating the memory channel control interface 270 according to the initial pre-fetch reference obtained from the pre-fetch reference register 230 in order to cause the memory channel controller 220 to retrieve from an external-source-memory, using the external memory interface 310, the contents of one or more memory locations in said external-source-memory. The transfer controller 300 then directs the memory channel controller 220 to present that information to the internal memory bus 275. The transfer controller 300 then uses storage control signals 265 to store the pre-fetched content into at least one of the first-level cache 205, the second-level cache 210, and the third-level cache 215.

The transfer controller 300 of one alternative example embodiment also provides for storing of the information presented on the internal memory bus 275 into a local-general-memory 225. The transfer controller 300 generates an offset memory address that corresponds to the locations from which information was pre-fetched from the external-source-memory. This offset memory address is directed to the local-general-memory 225 by way of a special address bus 280.

It should be appreciated that, according to this alternative example embodiment of a processing system 190, the local-general-memory 225 and an external-source-memory, accessed by way of the memory channel controller 220, share a common address space. Accordingly the offset applied to a pre-fetch reference is determined based upon the physical address of the local-general-memory 225 within this common address space.

Figure 8:
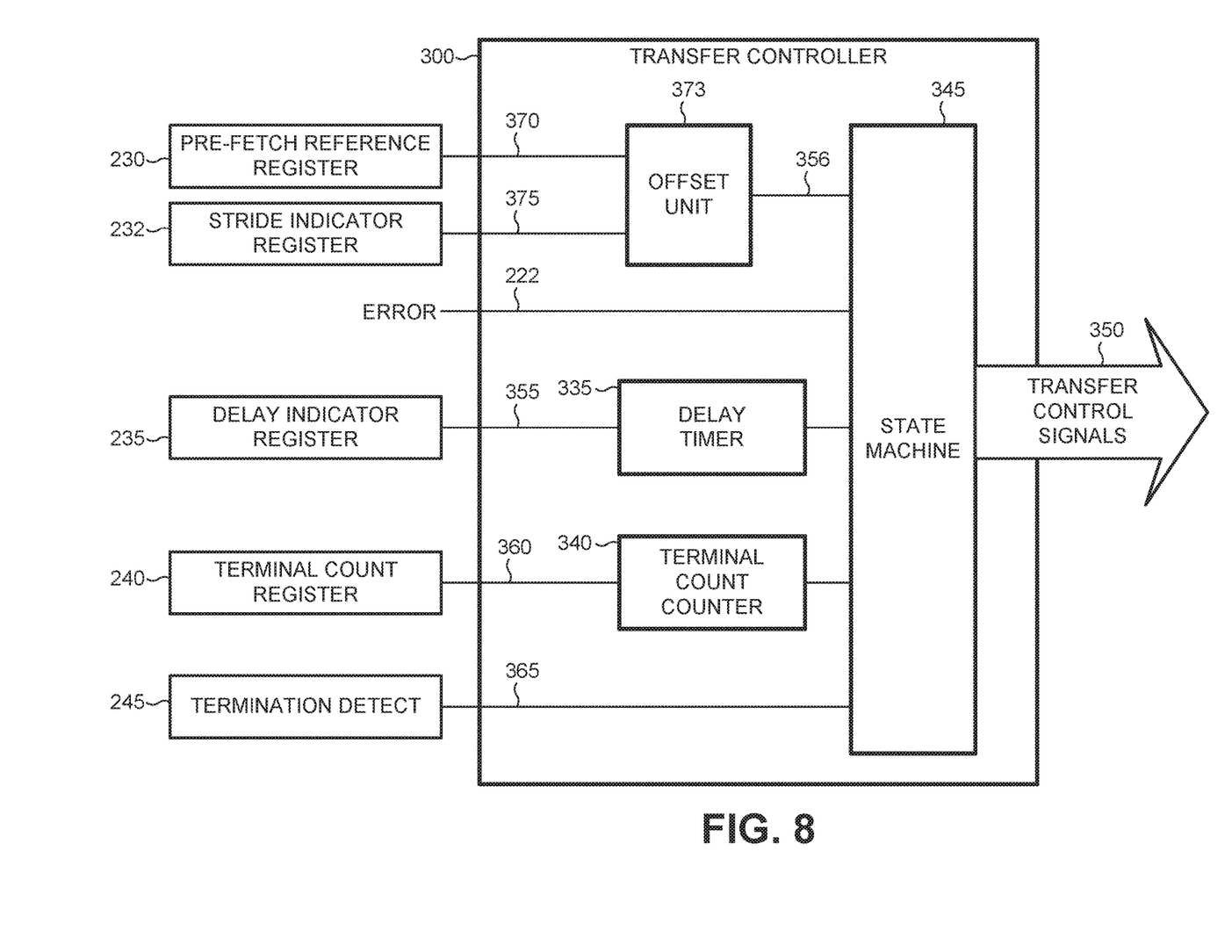
FIG. 8 is a diagram that depicts several alternative example embodiments of a transfer controller.

FIG. 8 is a diagram that depicts several alternative example embodiments of a transfer controller. According to a first example embodiment, the pre-fetch controller 280 is capable of generating a new pre-fetch reference according to the pre-fetch reference stored in the pre-fetch reference register 230 and a stride-indicator stored in the stride-indicator register 232. According to one alternative example embodiment, the transfer controller 300, which is included in the pre-fetch controller 280, includes an offset unit 373. The offset unit 373 receives 370 a pre-fetch reference that is stored in the pre-fetch reference register 230. The offset unit 373 also receives 375 a stride-indicator, which is stored in the stride-indicator register 232.

In operation, the offset unit 373 is capable of combining the pre-fetch reference 370 with the stride-indicator 375 to generate a new pre-fetch reference 356, which is then directed to a state machine 345 included in the transfer controller 300. In one alternative embodiment, the offset unit 373 comprises a summation circuit. The state machine 345, in turn, generates control signals 350 that affect the transfer of additional content from an external-source-memory. These control signals 350 include the control signals 270 for controlling the memory channel controller 220 and are partially based on the new pre-fetch reference 356.

Accordingly, the transfer control signals 350, as generated by the state machine 345, enable the pre-fetch controller 280 to direct the memory channel controller 220 to retrieve the content stored in one or more locations in an external source memory, said location(s) being accessed according to the new pre-fetch reference 356. This content is then, based upon the control signals 350, directed from the memory channel controller 220 to at least one of the local-general-memory 225, the first-level cache memory 205, the second-level cache memory 210, and the third-level cache memory 215.

As already discussed, one alternative example embodiment of a processing system 190 includes a transformation unit 281. In this alternative example embodiment, the pre-fetch controller 280 is further capable of controlling the memory channel controller 220 in order to retrieve content from one or more locations in an external-source-memory and to direct that content to the transformation unit 281. In one alternative embodiment, the content is conveyed from the memory channel controller 220 to the transformation unit 281 using a special bus 282. In one alternative embodiment, the transfer controller 300 generates a transformation unit control signal 395, which controls the transfer of information to the transformation unit 281.

The transformation unit control signal 395 enables the transfer controller 300 to cause the transformation unit 281 to accept content from the memory channel controller 220. In operation, the transformation unit 281 provides a status signal 390 back to the transfer controller 300. Transformation unit 281 activates the status signal 390 when a transformation is completed. Accordingly, the transfer control unit 300 uses the transformation unit control signal 395 in order to cause the transformation unit 281 to present the results of transformation operation to the internal memory bus 275.

The transfer controller 300 is further capable of causing the output of the transformation unit 281 to be stored in at least one of the local-general-memory 225, the first-level cache memory 205, the second-level cache memory 210, and the third-level cache memory 215. As can now be appreciated, these transfers are affected by the transfer controller 300 using cache storage signals 265. The special address bus 280 is used for those cases where the results of the transformed content are to be stored in the local-general-memory 225.

Figure 7:
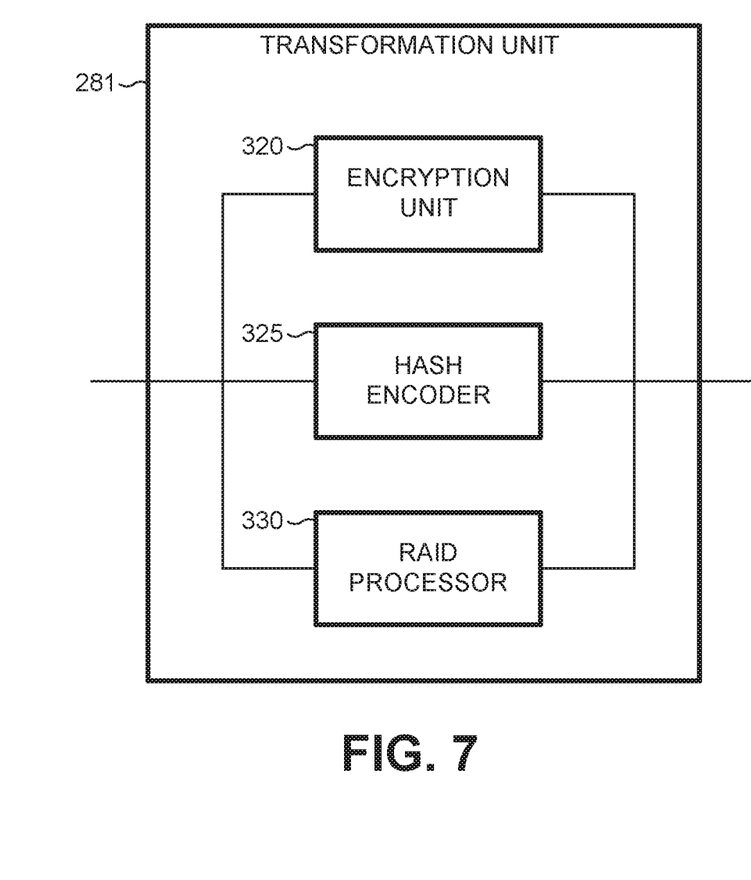
FIG. 7 is a pictorial diagram that depicts various alternative embodiments of a transformation unit.

FIG. 7 is a pictorial diagram that depicts various alternative embodiments of a transformation unit. As can be appreciated from the teachings and techniques herein established, the transformation unit 281, according to various alternative example embodiments, comprises at least one of an encryption unit 320, a hash encoder 325 and a RAID processor 330.

FIG. 8 further illustrates that, according to one alternative example embodiment, the transfer controller 300 further includes a delay timer 335. In this alternative example embodiment, the state machine 345, which is included in the transfer controller 300, is minimally capable of loading the delay timer 335 with a delay-indicator 355, which is stored in the delay-indicator register 235. It should be appreciated that, according to various illustrative use cases, the delay-indicator register 235 receives a delay-indicator from the processing core 200 when the processing core 200 executes particular software. As can be appreciated, such particular software is executed by the processing core 200 in order to minimally cause the processing core 200 to convey, to the pre-fetch controller 280, a priori knowledge as to the amount of delay that should be introduced in between pre-fetch cycles.

In operation, the state machine 345 is minimally capable of deferring the generation of transfer control signals 350 until the delay timer 335 expires, which the state machine 345 causes to operate. Accordingly, it is not until the delay timer 335 expires that the state machine 345 will cause the memory channel controller to direct the content of one or more memory locations in an external-source-memory into the specified memory, which is proximate to the processing core 200. It should be appreciated that, according to various alternative embodiments, the specified memory comprises at least one of the local-general-memory 225, the first-level cache memory 205, the second-level cache memory 210, and the third-level cache memory 215. It should likewise be appreciated that the state machine 345 will reload the delay timer after it affects a pre-fetch so that it can dwell according to the indicated delay. Once the delay timer 335 expires, a subsequent pre-fetch is conducted.

FIG. 6 also illustrates that, according to yet another alternative example embodiment, the transfer controller 280 further includes a terminal count register 240. The terminal count register 240 is used to receive from the processing core 200 an a priori value which dictates how many pre-fetches should be conducted by the pre-fetch controller 280. Accordingly, the transfer controller 300 of this alternative embodiment, as depicted in FIG. 8, further comprises a terminal-count counter 340.

In operation, the state machine 345 of this alternative embodiment minimally causes the terminal-count value stored in the terminal count register 240 to be stored in the terminal-count counter 340. The state machine 345 further minimally causes the terminal-count counter 340 to operate by one count when a pre-fetch occurs. As long as the terminal-count counter 340 has not reached a terminal value, the state machine 345 continues to generate transfer control signals 350. These transfer control signals 350 enable the state machine 345 to control the memory channel controller 220 in order to affect retrieval of the content from one or more locations in an external-source-memory and storage of this content in at least one of the local-general-memory 225, the first-level cache memory 205, the second-level cache memory 210, and the third-level cache memory 215.

FIG. 6 also illustrates that, according to yet another alternative example embodiment, the transfer controller 280 further includes a termination-detect register 245. The termination-detect register 240 is used as a memory-mapped trigger that allows the processing core 200 to discontinue pre-fetch operation. Accordingly, the transfer controller 300 of this alternative embodiment, as depicted in FIG. 8, further comprises a termination-detect input 365. In operation, the state machine 345 continues to manipulate the transfer control signals 350 so as to affect additional pre-fetch cycles according to the techniques and teachings herein described. However, once a termination-detect signal is presented to the termination-detect input 365, the state machine 345 discontinues additional-pre-fetch activity.

FIG. 6 also illustrates that, according to yet another alternative example embodiment, the transfer controller 280 further includes an "ERROR" input 222. The ERROR input 222 is directed to the transfer controller 300 of this alternative embodiment, as depicted in FIG. 8. In operation, the state machine 345 continues to manipulate the transfer control signals 350 so as to affect additional pre-fetch cycles according to the techniques and teachings herein described. However, once an ERROR signal is presented to the ERROR input 222, the state machine 345 discontinues additional-pre-fetch activity. The ERROR input, according to various alternative example illustrative use cases, receives an input from a memory error checking system, for example an error-checking-correction (ECC) circuit or a parity error detection circuit.

Aspects of the method and apparatus described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessing cores, firmware, software, etc. Furthermore, aspects may be embodied in microprocessing core s having software-based circuit emulation, discrete logic (sequential and combinatorial), custom devices, fuzzy (neural) logic, quantum devices, and hybrids of any of the above device types.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for pre-fetching a cache entry for a processing core of a processing system using a hardware machine, the method comprising:
   receiving a reference for an initial pre-fetch;
   receiving a stride-indicator;
   fetching a first content from one or more memory locations from a memory according to the initial pre-fetch reference;
   generating an offset memory address for the first content based on the one or more memory locations of the memory;
   storing the first fetched content in a non-cache local random access memory,
   generating a reference for a subsequent pre-fetch according to the initial pre-fetch reference and the stride-indicator;
   fetching a second content of one or more memory locations from a memory according to the generated reference; and
   storing the second fetched content in a specified memory.

2. The method of claim 1 wherein storing the first fetched content in the non-cache local random access memory comprises:
   subjecting the one or more memory locations included in the first fetched content to an operation.

3. The method of claim 2 wherein subjecting the one or more memory locations included in a first fetched content to an operation comprises:
   subjecting the one or more memory locations included in a first fetched content to an operation including at least one of an encryption operation, a hash operation and a redundant-array-of-independent-disks operation.

4. The method of claim 1 wherein fetching a second content of one or more memory locations from a memory according to the generated reference comprises:
   receiving an indication for delay of a subsequent fetch operation; and
   fetching the second content of one or more memory locations from a memory according to the generated reference when the delay is expired.

5. The method of claim 1 wherein fetching a second content of one or more memory locations from a memory according to the generated reference comprises:
   receiving a terminal count indicator; and
   fetching the second content of one or more memory locations from a memory according to the generated reference while the terminal count indicator has not been satisfied.

6. The method of claim 1 wherein fetching a second content of one or more memory locations from a memory according to the generated reference comprises:
   fetching the second content of one or more memory locations from a memory according to the generated reference unless a termination indicator is received.

7. The method of claim 1 wherein fetching a second content of one or more memory locations from a memory according to the generated reference comprises:
   fetching the second content of one or more memory locations from a memory according to the generated reference unless an error indicator is received.

* * * * *